United States Patent
Everhart

(10) Patent No.: US 6,928,614 B1
(45) Date of Patent: Aug. 9, 2005

(54) MOBILE OFFICE WITH SPEECH RECOGNITION

(75) Inventor: Charles Allen Everhart, Ypsilanti, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 911 days.

(21) Appl. No.: 09/170,156

(22) Filed: Oct. 13, 1998

(51) Int. Cl.$^7$ ................................................ G09G 5/00
(52) U.S. Cl. .................... 715/728; 715/716; 701/58; 701/59; 340/539.19
(58) Field of Search .................... 345/978, 2, 335, 345/716, 727, 728, 734, 737–739; 715/728, 716, 727, 734, 737, 738, 739; 340/539.19, 901, 988; 701/58, 59, 36, 57; 703/24, 23

(56) References Cited

U.S. PATENT DOCUMENTS

| | | | |
|---|---|---|---|
| 4,401,852 A | 8/1983 | Noso et al. | 367/198 |
| 4,455,454 A | 6/1984 | Umebayashi | 455/556 |
| 4,501,012 A | 2/1985 | Kishi et al. | 704/275 |
| 4,503,528 A | 3/1985 | Nojiri et al. | 367/198 |
| 4,528,687 A | 7/1985 | Noso et al. | 704/275 |
| 4,637,045 A | 1/1987 | Noso et al. | 704/275 |
| 4,792,783 A | 12/1988 | Burgess et al. | 307/10.1 |
| 4,827,520 A | 5/1989 | Zeinstra | 704/275 |
| 5,020,107 A | 5/1991 | Rohani et al. | 704/275 |
| 5,172,321 A | 12/1992 | Ghaem et al. | 455/456 |
| 5,177,685 A | 1/1993 | Davis et al. | 455/456 |
| 5,214,707 A | 5/1993 | Fujimoto et al. | 704/275 |
| 5,239,700 A | 8/1993 | Guenther et al. | 455/158.4 |
| 5,450,525 A | 9/1995 | Russell et al. | 704/275 |
| 5,544,061 A | 8/1996 | Morimoto et al. | 701/202 |
| 5,602,963 A | 2/1997 | Bissonnette et al. | 704/275 |
| 5,664,061 A | 9/1997 | Andreshak et al. | 704/275 |
| 5,732,074 A * | 3/1998 | Spaur et al. | 370/313 |
| 5,917,405 A * | 6/1999 | Joao | 340/426.17 |
| 6,023,232 A * | 2/2000 | Eitzenberger | 340/988 |
| 6,032,089 A * | 2/2000 | Buckley | 701/36 |
| 6,148,253 A * | 11/2000 | Taguchi et al. | 701/48 |
| 6,628,233 B2 * | 9/2003 | Knockeart et al. | 342/357.1 |

OTHER PUBLICATIONS

Evolution of the Office on Wheels Toward the Intelligent Vehicle/Highway System, 1990.*
The Network Vehicle, Press release from COMDEX Fall 1997, Nov. 1997.*
Delphi, IBM, Sun Microsystems and Netscape Showcase Mobile with 'Network Vehicle', Feb. 1998.*
"Vox Populi, Someone could make a fortune by inventing a good universal remote for accessory controls", Paul Van Valkenburgh, Automotive Industries, Nov., 1993, pp. 51–52.
"Auto 2010", Paul Van Valkenburgh, 1991, pp. 88–89.
Speech Recognition And In–Vehicle Interfaces Prototype For Intelligent Vehicle–Highway Systems, Mary T. Mock, The MITRE Corporation, pp. 650–655.
Vehicle Navigation & Information Systems Conference Proceedings, P–253, Part 2, Human Factors Engineering the TravTek Driver Interface, Dingus, et al., pp. 749–755.

* cited by examiner

Primary Examiner—Tadesse Hailu
(74) Attorney, Agent, or Firm—Brinks Hofer Gilson & Lione

(57) ABSTRACT

A user interface for a mobile office is provided for allowing simple, safe, and convenient access to electronic mail, calendar, news, and web browser functions. The dialog or number of steps required to access desired items is minimized using a state controller responsive to voice commands and manual activations of reconfigurable steering wheel switches. Someone unfamiliar with the user interface is assisted by prompts for various commands and can use the mobile office without needing to resort to use of the reconfigurable steering wheel control elements. A more experienced user can bypass prompts by interrupting them with voice commands and can quickly move through various steps by utilizing the configurable steering wheel control elements to gain access to individual items within the mail, calendar, and news functions.

13 Claims, 8 Drawing Sheets

MOBILE OFFICE WITH SPEECH RECOGNITION

BACKGROUND OF THE INVENTION

This application is related to commonly assigned application Serial No. (97-1232), entitled "Vehicle Accessory Control with Integrated Voice and Manual Activation", filed concurrently herewith.

The present invention relates in general to a voice controlled mobile office, and more specifically to a user interface for a mobile office employing both speech recognition and reconfigurable, steering wheel-mounted control switches.

The use of electronic data processing for business and personal tasks such as e-mail, electronic calendaring, network information exchange, and web browsing is becoming widespread. Continuous accessibility to these functions is often desired, especially for business users. Thus, a need exists to make these functions available in mobile vehicles. To help insure that a mobile office can be used without interfering with the task of driving a vehicle, a simple and efficient driver-machine interface (DMI) is desired. For example, a desire to maintain the driver's hands on the steering wheel and eyes on the road has led to an interest in voice recognition technologies. Systems using voice recognition can initiate control actions based on spoken commands being recognized using advanced computation techniques.

Voice activation systems require the user to learn a predetermined grammar (i.e., a set of spoken commands) which can be recognized by the system. As the number of controlled systems and the corresponding functions controlled by speech command increases, the user is required to learn an ever larger grammar. To simplify the voice recognition task and minimize the required grammar, it has been suggested to provide manual control switches on a steering wheel which may be reconfigured using voice commands. However, system cost and complexity are still driven up as more features and components are added to the voice actuation system itself. Furthermore, control operations can still remain complex and difficult to use and remember without an appropriate interface.

SUMMARY OF THE INVENTION

The present invention has the advantage of providing a convenient and easy to use mobile office interface which integrates both voice and manual user inputs to provide simplicity and flexibility when controlling mobile office functions.

In one aspect of the invention, a mobile information system within a vehicle processes information which is wirelessly exchanged with a remote information server. A microphone receives spoken sounds, and a speech processor coupled to the microphone recognizes the spoken sounds and identifies corresponding voice commands for processing the information. A state controller, which may be integrated with the speech processor, is responsive to commands including the voice commands from the speech processor. The state controller has a main menu mode and an electronic mail mode. Reconfigurable control elements are coupled to the state controller and mounted on a steering wheel of the vehicle for generating control signals to select particular manual commands in accordance with a current state of the state controller. A heads-up display coupled to the state controller displays at least one indicator above an instrument panel of the vehicle, the indicator identifying the manual commands available in the current state. A voice synthesizer generates audio output corresponding to the processed information. A wireless communication device exchanges information with the remote information server. The main menu mode provides selectable access to the electronic mail mode. The electronic mail mode is comprised of (1) an "initial mail" state for selecting by voice command the reading of either old mail or new mail, (2) a "reading note" state wherein the old mail or new mail is reproduced by the voice synthesizer, and (3) a "next-previous" note state that is accessed from the "reading note" state to select a different electronic mail note for said "reading note" state in response to either a corresponding voice command or a manual command.

DETAILED DESCRIPTION OF PREFERRED EMBODIMENTS

Figure 1:
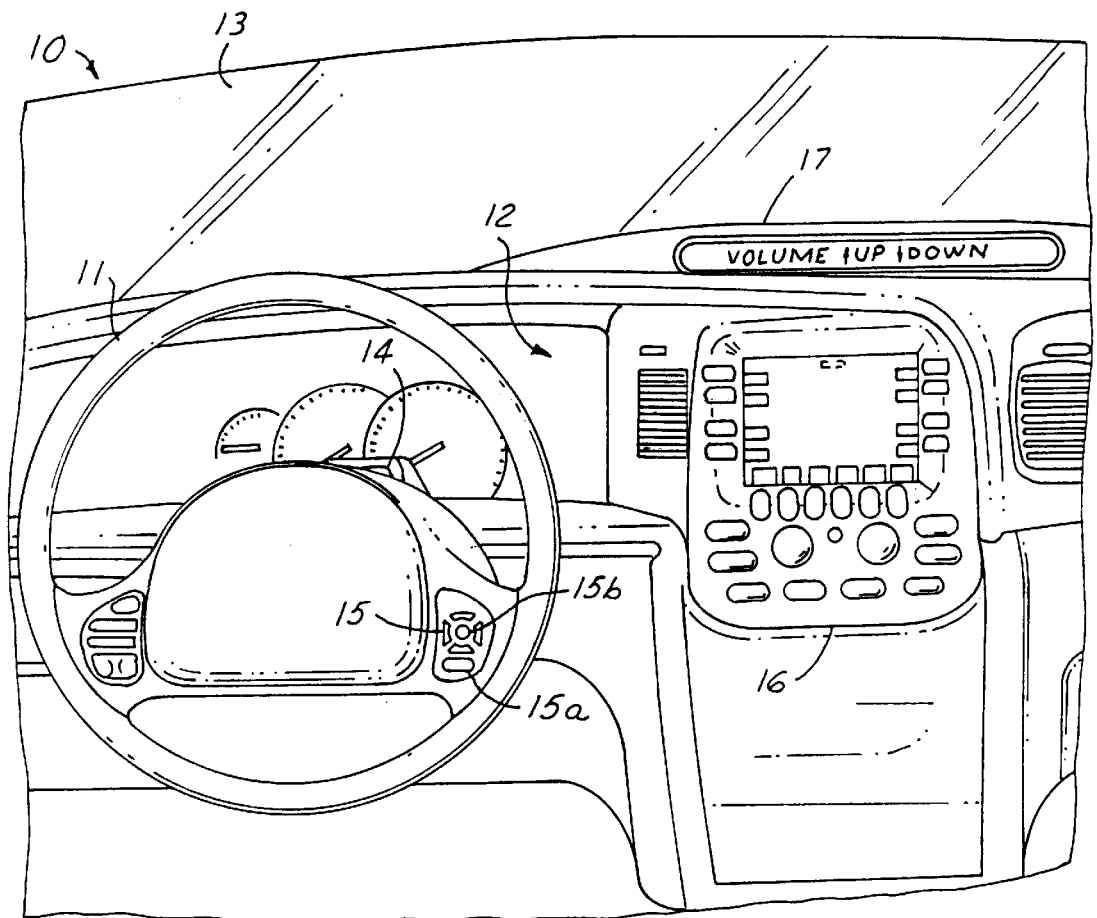
FIG. 1 is an interior view of a vehicle passenger cabin including the control system of the present invention.
Figure 2:
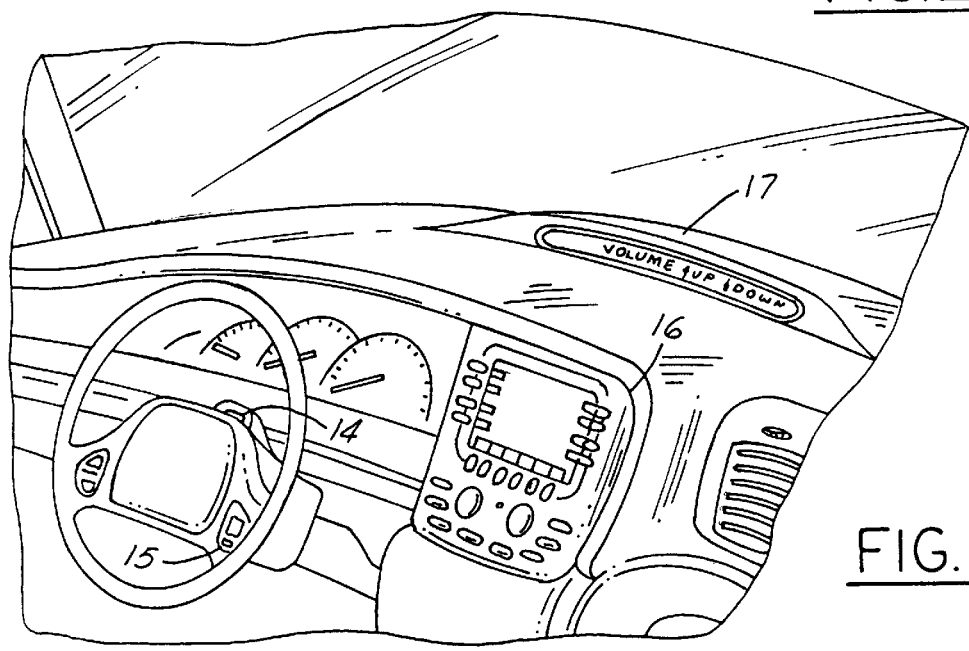
FIG. 2 is a perspective view of the passenger cabin illustrating the location of a heads-up display.

Referring to FIG. 1, an automotive vehicle includes a passenger cabin 10 with a steering wheel 11, an instrument panel or dashboard 12, and a front window 13. The microphone 14 and a control pad of reconfigurable control elements 15 are mounted on steering wheel 11. A central display/control unit 16 is mounted to the front of instrument panel 12, and is used for more complex office applications such as web browsing as will be described below. A heads-up display in the form of an eyebrow-shaped display 17 is mounted proximate to an interface between instrument panel 12 and front window 13. Eyebrow display 17 is used to show the driver what particular functional parameter may be adjusted using the configurable control elements 15 at any particular time. "Functional parameter" includes a transition between controller states to read a different e-mail note, for example. As is more apparent from FIG. 2, the driver can easily refer to eyebrow display 17 to discern the current function assignments for the reconfigurable control elements without taking attention away from the road.

Figure 3:
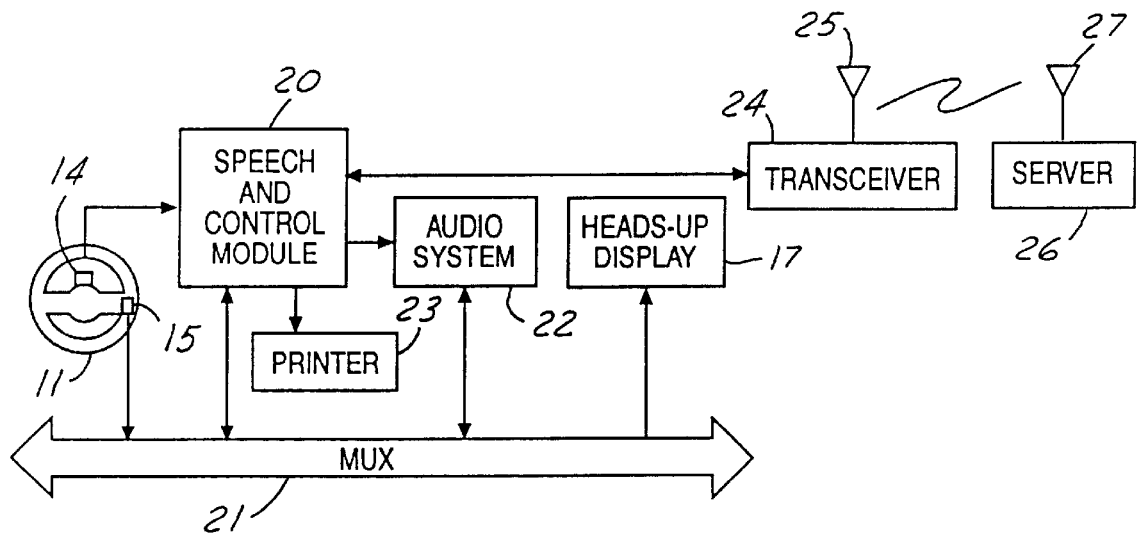
FIG. 3 is a block diagram showing the mobile office system of the present invention.

FIG. 3 shows a preferred embodiment of a system architecture for performing the present invention. In particular, a speech recognition interface is provided to provide driver control while speech synthesis is employed for system output, whereby electronic mail, calendar, and news items are read aloud to provide information to the driver. Thus, a speech and control module 20 is connected to microphone 14, a multiplex system 21, an audio system 22, a printer 23, and a transceiver 24. Reconfigurable control elements 15, heads-up display 17, and audio system 22 are also connected to multiplex system 21. Transceiver 24 includes an antenna 25 to communicate over RF with a server 26 through its antenna 27. Transceiver 24 may be a cellular modem, for example. Server 26 may be a private network on which the driver is an authorized user or may be a server on the worldwide web, for example.

Speech and control module 20 includes voice recognition software (such as Hark), a speech synthesizer (many are commercially available), and office application software for e-mail, calendar, news, and web browser. Speech control module 20 receives textual information from transceiver 24 which may be printed on printer 23. The textual information is converted to speech by the speech synthesizer and played through audio system 22 over the vehicle speakers (not shown).

The user interface of speech and control module 20 is configured as a state controller which is responsive to commands including voice commands from the speech processor and manual commands from the reconfigurable control elements. The current state of the state controller determines what mobile office functions are currently available, what spoken commands are currently valid, and what actions will result from manual activation of the steering wheel-mounted reconfigurable control elements.

Figure 4:
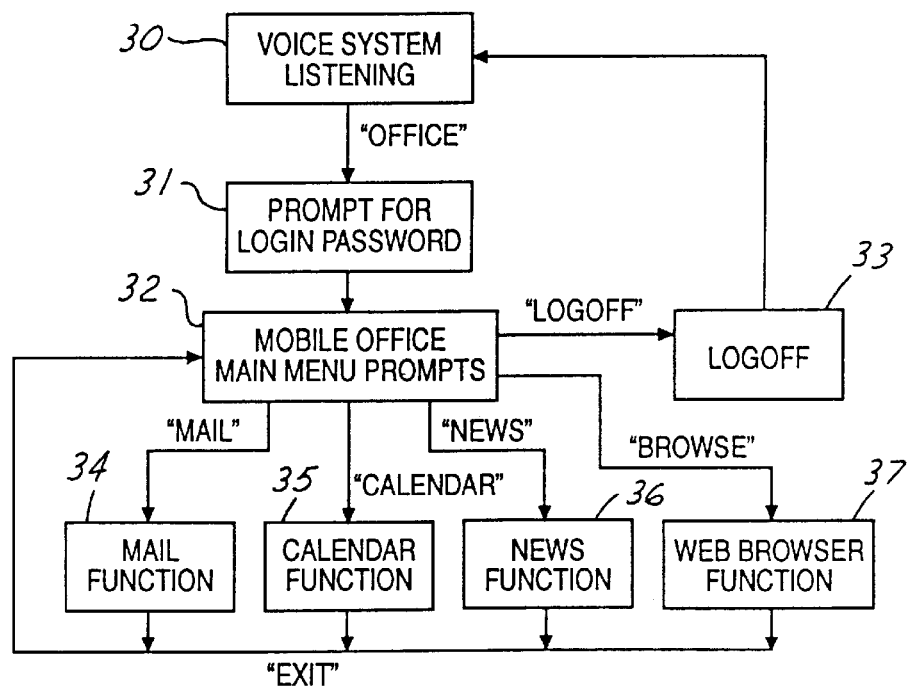
FIG. 4 is a flowchart including the main menu mode of the present invention.

FIG. 4 shows the organization and operation of speech and control module 20 according to its main menu. The voice recognition system may typically be controlling other functions in the vehicle other than mobile office functions. Speech recognition is initiated by pressing a push-to-talk button which may be included with reconfigurable control elements 15. Consequently, the voice system begins listening in a state 30, and when the command "office" is recognized then an audible prompt for a login password is reproduced in state 31. To simplify recognition for entering a password, use of a numeric password may be desired. The password is transmitted for obtaining access to the remote server. Once a valid password is recognized, a main menu state for mobile office functions is entered at state 32. A series of audible prompts are reproduced to remind the user of the functions available together with the keywords that are spoken to access them. If a voice command of "logoff" is recognized, then a logoff state 33 is entered for performing the logoff operations. This may be ensued by state 30 to reenter the mobile office functions or to access other vehicle systems.

The mobile office functions include a mail mode 34, a calendar mode 35, a news mode 36, and a web browser mode 37 that are entered by corresponding voice commands. Upon exiting any of these modes, a return is made to the mobile office main menu state 32.

Eyebrow display 17 may provide user feedback during the entry of voice commands. Thus, after the push-to-talk button is pressed, the eyebrow display may display the word "listening". If a spoken word is not recognized as a valid command, a message of "command not recognized" is displayed. When a valid command is recognized, that command is preferably displayed on the eyebrow display.

Figure 5:
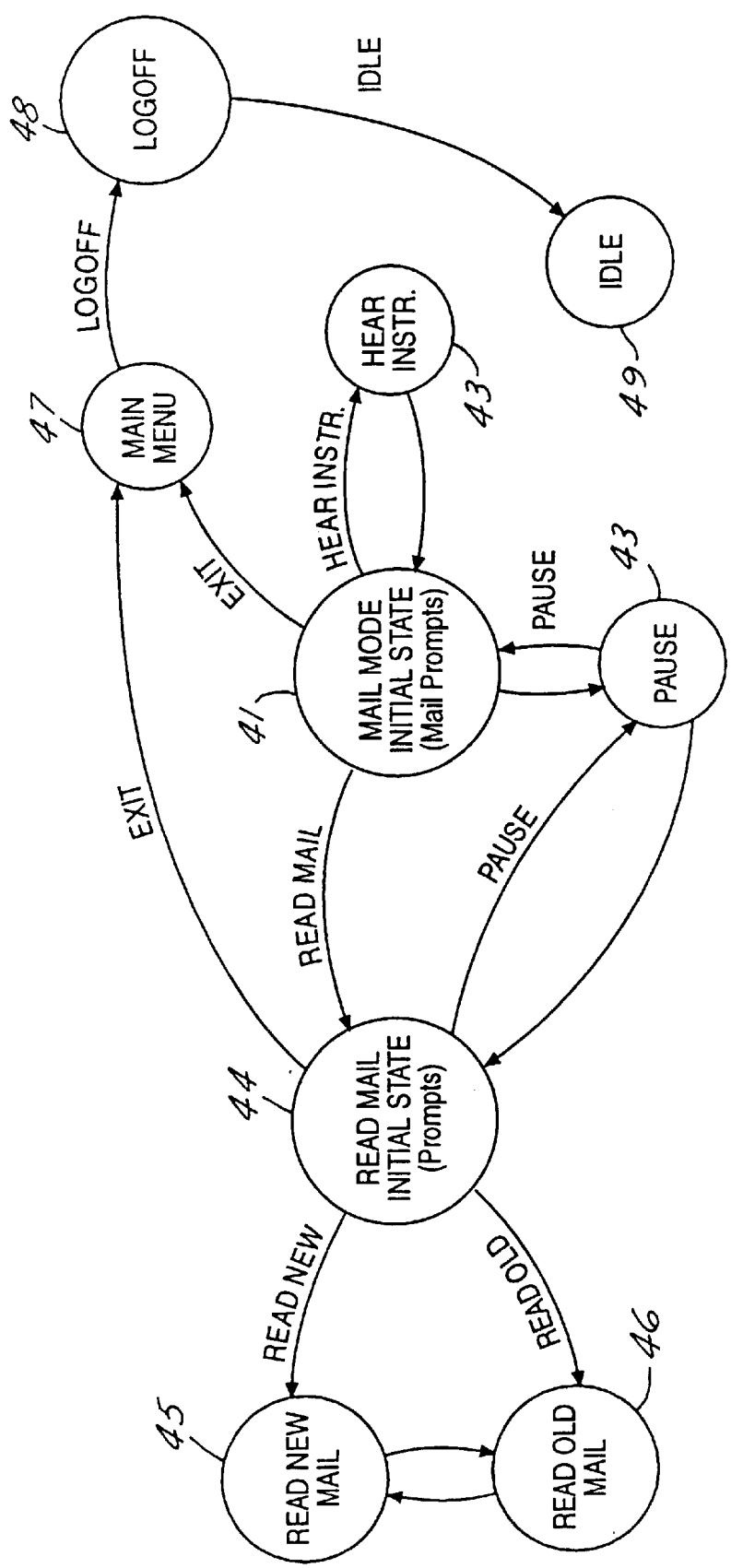
FIG. 5 is a state diagram showing the electronic mail mode.

The electronic mail mode is shown in greater detail in FIG. 5. The mail mode includes an initial state 41 which automatically proceeds to a hear instructions state 42 for providing audible help information for the available mail functions. A pause state 43 may be entered at any time to pause voice processing by speaking a "pause" command. In response to a "read mail" voice command, a read mail initial state 44 is entered. Prompts are given explaining that new mail or old mail may be read. Pause state 43 can be entered from state 44.

While in state 44, if a "read new" voice command is recognized then a read new mail state 45 is entered. If a "read old" voice command is recognized, then a state 46 is entered for reading old (i.e., previously read and saved) mail.

The "pause" and "exit" voice commands are preferably valid while in each and every state. Thus, pause state 43 can be entered from any other state. When unpaused, state 43 transitions back to the state from which it was entered. The "exit" voice command leads from any state to a main menu state 47. Any of the mode initial states such as mail mode initial state 41 can be entered from main menu state 47. In response to the "logoff" voice command, a logoff state 48 is entered wherein the speech and control module logs off from the remote server. After logging off, the state controller automatically transitions to an idle state 49. From idle state 49, the user can initiate a listening state of the voice system for possible reentry to the mobile office functions.

Figure 6:
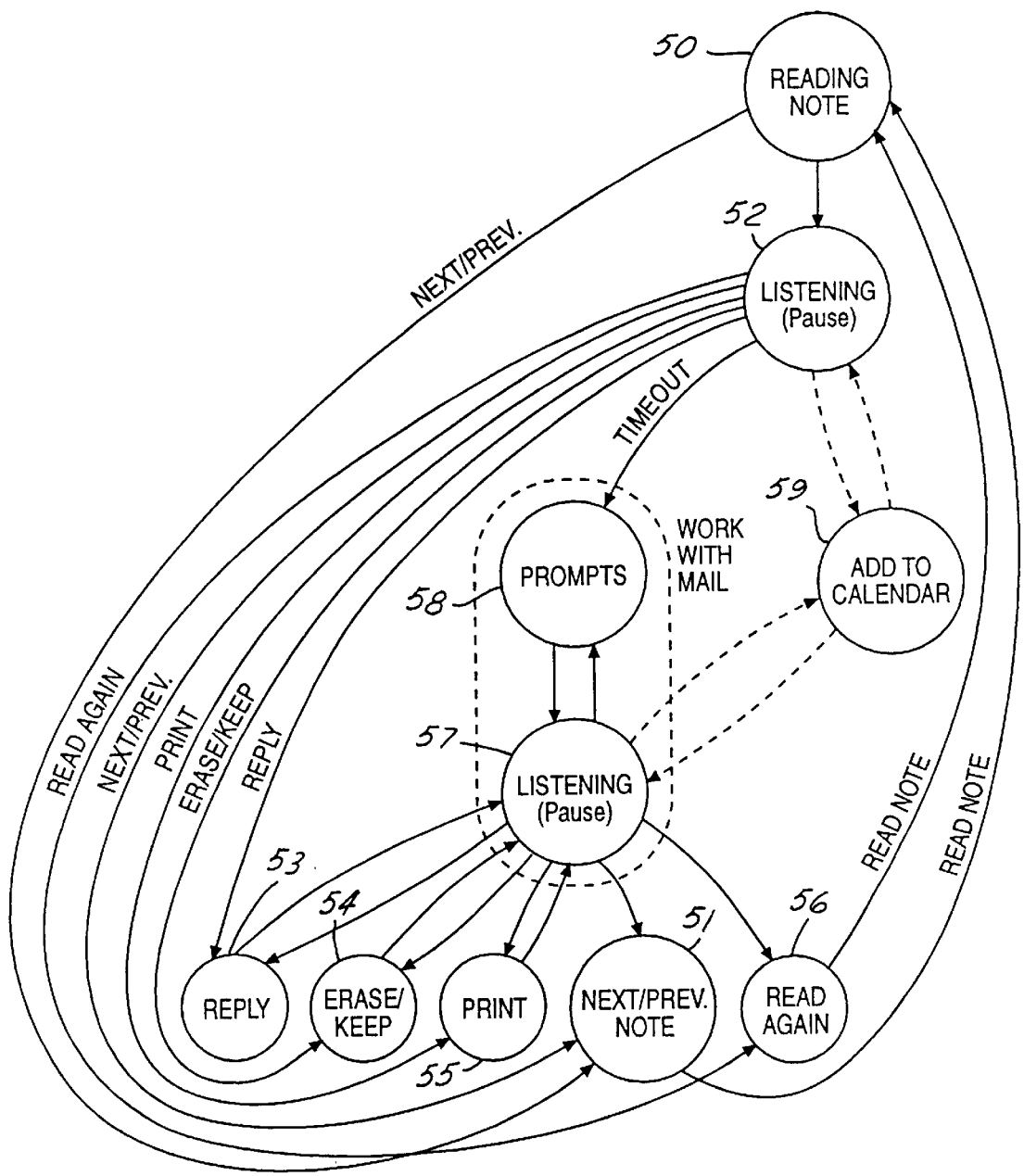
FIG. 6 is a state diagram showing the reading note state of the electronic mail mode in greater detail.

The states for reading a note are shown in greater detail in FIG. 6. Once old or new mail is identified (and if one or more notes are present), a reading note state 50 is entered. While in state 50, the text of the first or current note is converted to spoken output and sent to the audio system for reproduction over the loudspeakers. While in state 50, the reconfigurable steering wheel switches are configured to perform a next-previous note selection function and the eyebrow display shows a message identifying which steering wheel switches can access next or previous notes. In response to either a spoken command of "next" or "previous" or manual activation of an appropriate reconfigurable steering wheel control element, a next-previous note state 51 is entered. The next or previous note is retrieved and a return is made to state 50 to begin reading the next or previous note (which now becomes the current note). To work with or take action concerning any particular note, the driver may initiate a listening period in state 52 by pressing the push-to-talk button. Via the appropriate spoken commands, the driver can initiate a reply state 53, an erase/keep state 54, a print state 55, or a read-again state 56. In reply state 53, a listening period is established for recognizing a spoken message from the user. The message is converted to text for sending through the server to the originator of the note being replied to. States 54–56 perform typical mail processing functions.

After performing the corresponding function or after activation of the push-to-talk button while in any of states 53–55, a transition is made to a listening state 57. If a predetermined period of time, such as 5 seconds, passes without a command being spoken after entering listening state 57 (or listening state 52), then help prompts are reproduced in a state 58.

If the current note is specially formatted as a notice of a meeting, then the meeting details can be added to the driver/user's calendar in a state 59 which is entered from listening states 52 or 57 in response to an appropriate "add to calendar" voice command.

Reconfigurable control elements 15 preferably include up, down, right, and left push buttons. The up and down buttons may be used for accessing a next or a previous note, respectively, while in state 50. The right and left buttons can be configured to fast scan within a currently reproduced note in order to locate a desired portion of the note. Alternatively, the right and left buttons can be configured to adjust the playback speed used by the voice synthesizer. The availability of these functions is shown on the eyebrow display. These functions are preferably also made available during appropriate states when reading calendar and news items described below.

Figure 7:
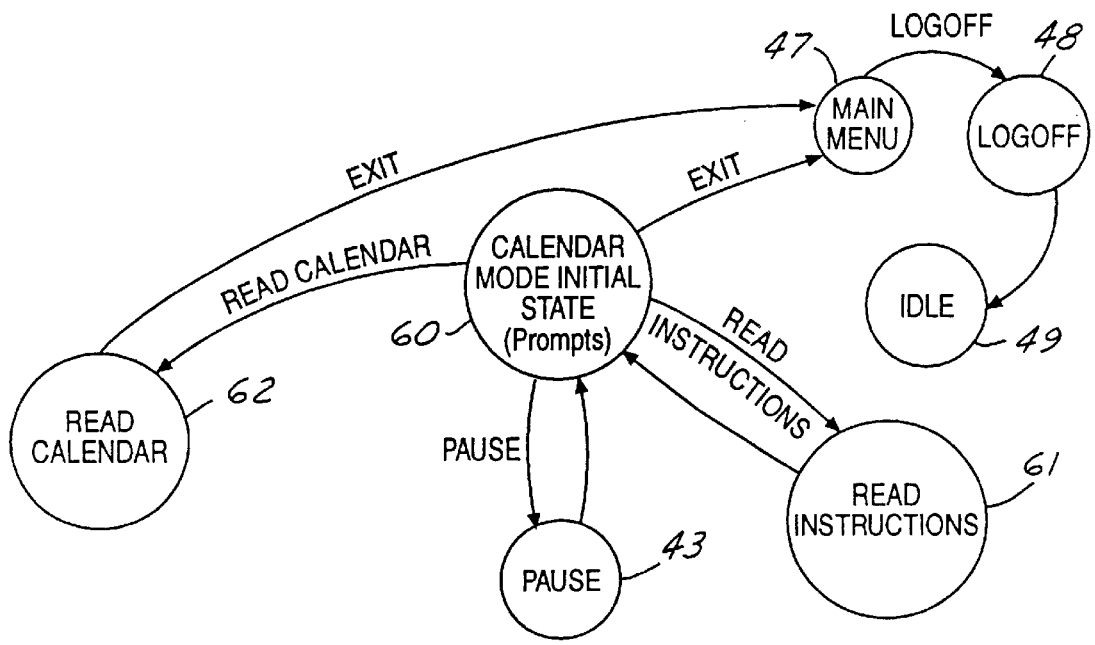
FIG. 7 is a state diagram showing the calendar mode.

The calendar mode of the present invention will be described in more detail with reference to FIGS. 7–9. A calendar mode initial state 60 may be entered from the main menu. While in state 60, a series of prompts are reproduced identifying the voice commands for entering the states for various calendar functions. More detailed instructions may be obtained in a read instructions state 61 which is accessed by a "read instructions" voice command. In response to a "read calendar" voice command, a read calendar state 62 is entered for reproducing calendar entries.

Figure 8:
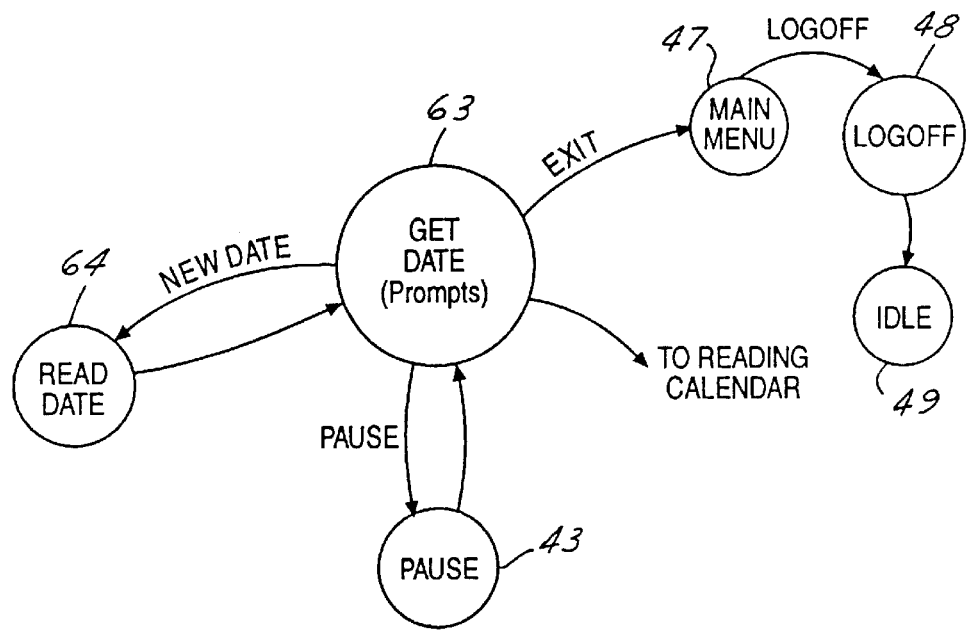
FIG. 8 is a state diagram showing a read date state for the calendar mode.
Figure 9:
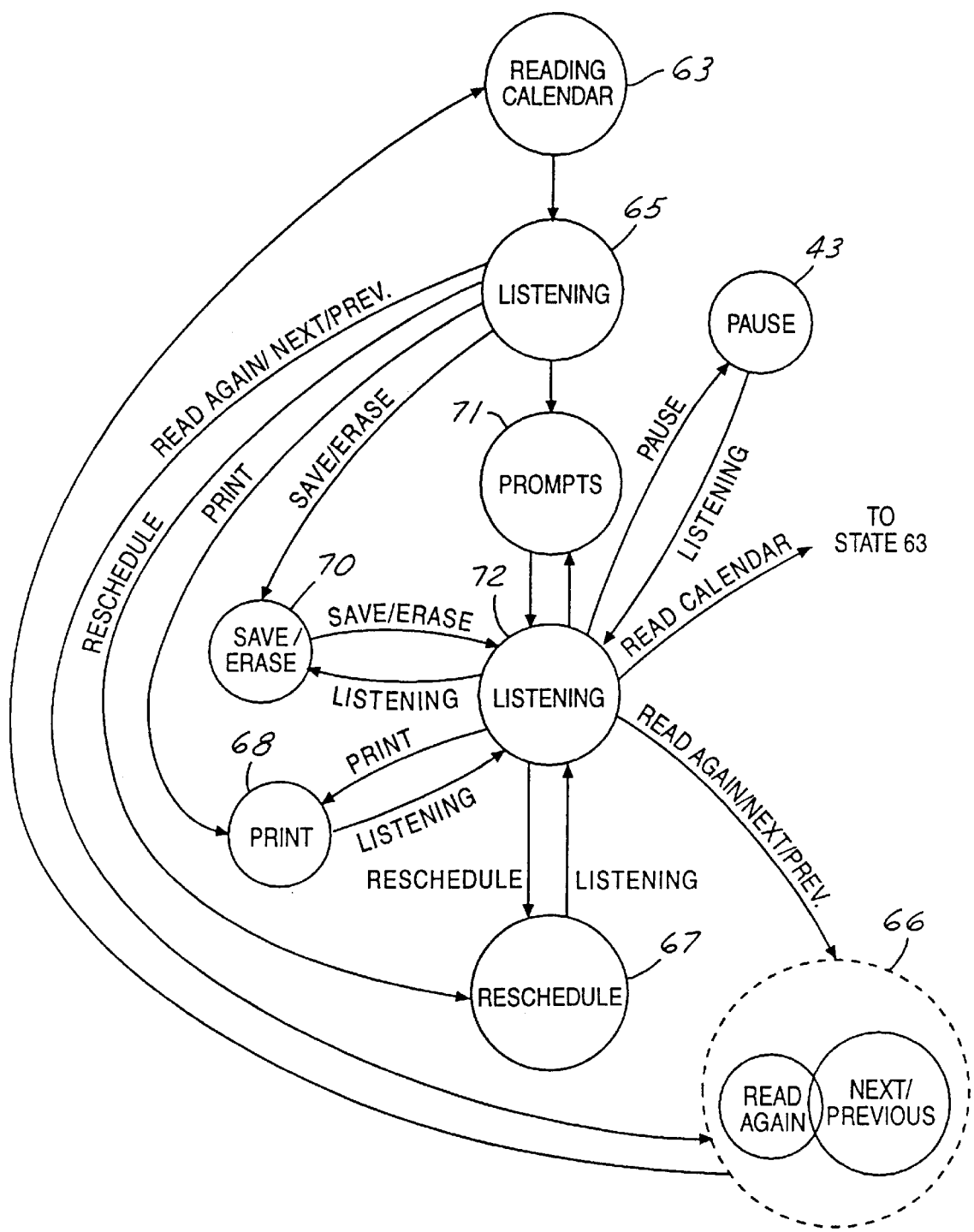
FIG. 9 is a state diagram showing a reading calendar state for the calendar mode.

Further states within the read calendar state are shown in FIGS. 8 and 9. Initially, a get date state 63 is entered in FIG. 8. Preferably, a current date maintained within the speech and control module is used as a default date. Prompts are given identifying the currently set date (i.e., initially the default date) along with prompts for the available voice commands. In response to a "selective active calendar day" voice command, a read date state 64 is entered for entering voice commands such as month, day, year, "yesterday", "today", "tomorrow", or others, with appropriate prompts being given. In response to a further "read" command, state 63 transitions to a reading calendar state 64 shown in FIG. 9.

In state 64, the text associated with a calendar entry for the current date is reproduced using the text to speech conversion. While in reading calendar state 64, a reconfigurable steering wheel control elements are configured to perform scrolling to a next or a previous calendar item. In addition, a control element may be configured to perform a read again function to repeat a reading of the current item. Following the reproduction of the current calendar item, a transition is made to a listening state 65. In response to a voice command corresponding to "read again", "next", or "previous" from state 65 or in response to manual activation of the reconfigurable control elements while in states 64 or 65, a transition is made to read-again/next/previous states 66. Based upon corresponding voice commands, a transition may be made from listening state 65 to a reschedule state 67, a print state 68, or a save/erase state 70. If no voice command is received after a predetermined time in listening state 65, detailed help prompts are given in a state 71 followed by a listening state 72. Listening state 72 may lead to read-again/next/previous state 66 in response to a "read again/next/previous" voice command, print state 68 in response to a "print" command, reschedule state 67 in response to a "reschedule" command, or save/erase state 70 in response to a "save/erase" command. Also from state 72, a new "read calendar" voice command or a "new date" command may be received and a resulting transition is made to state 63 (FIG. 8).

Figure 10:
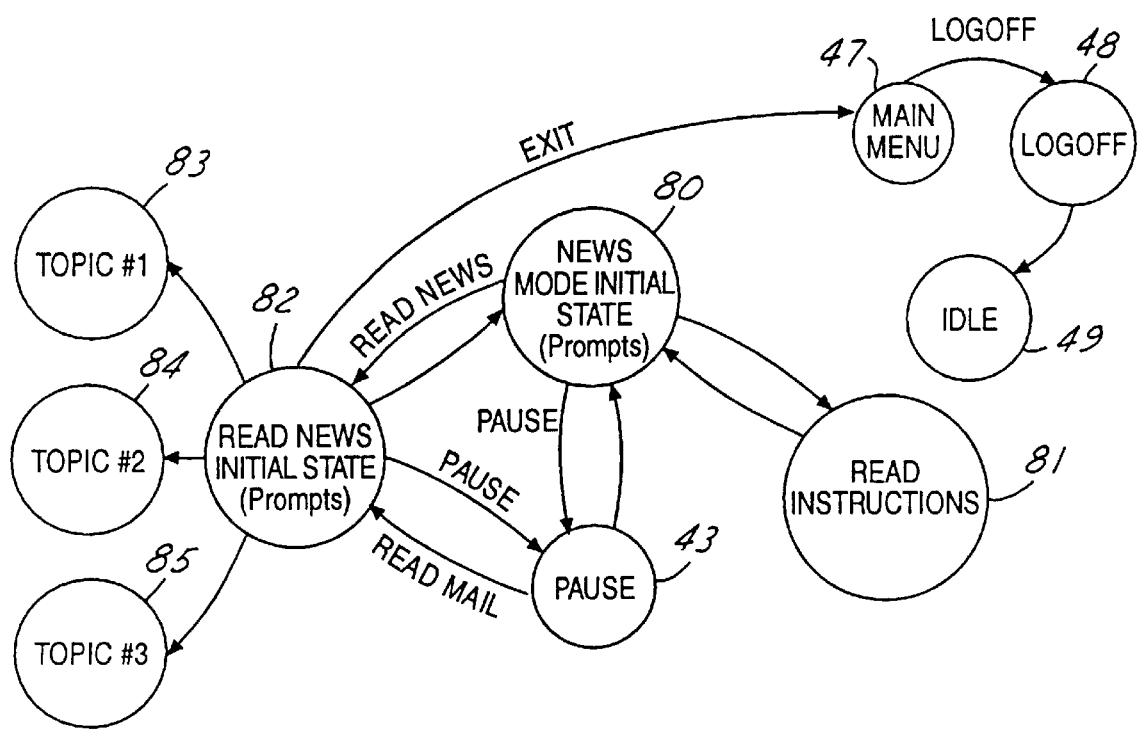
FIG. 10 is a state diagram showing the news mode.

The news mode of the present invention will be described with reference to FIGS. 10–12. In FIG. 10, a news mode initial state 80 can be entered from the main menu and provides prompts associated with the available news functions. In response to a "read instructions" voice command, a read instruction state 81 is entered to provide detailed instructions for using the news mode. In response to a "read news" command, a read news initial state 82 is entered which provides additional prompts identifying news topics which may be reviewed. News items are organized into topics for easier retrieval. Thus, any predetermined organization of topics can be employed, such as topics for sports, weather, and business, for example. Voice commands corresponding to topic names or numbers are used in order to transition to topic states 83, 84, or 85.

Figure 11:
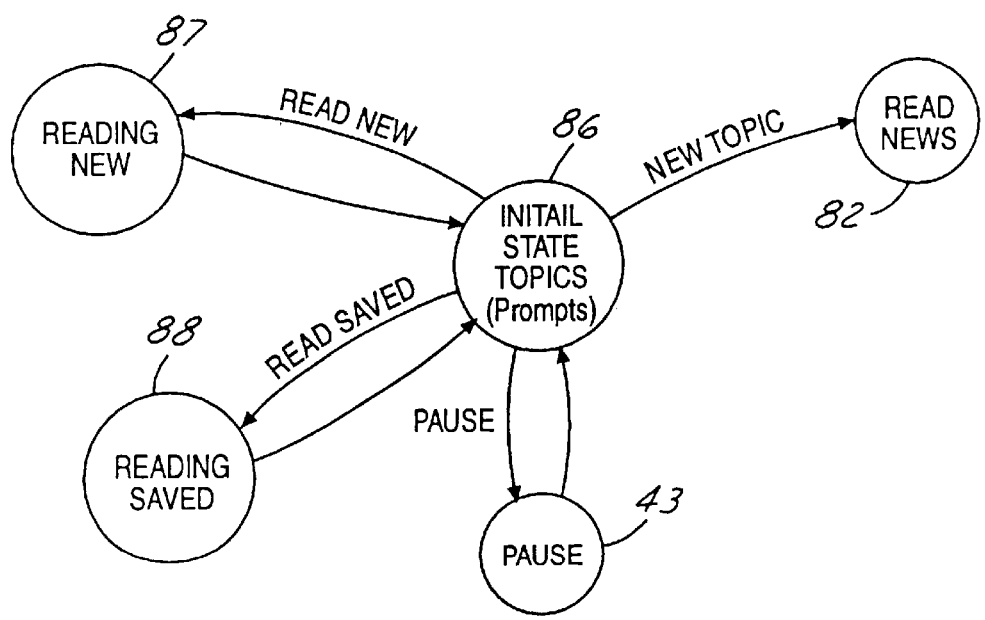
FIG. 11 is a state diagram showing the topic state within the news mode in greater detail.

As shown in FIG. 11, once a topic is identified, an initial topics state 86 is entered which provides audible prompts identifying the options to read either new news items or saved news items. Also, a new topic may be selected by a transition back to read news state 82.

In response to a "read new" news item voice command, a reading new state 87 is entered. Otherwise, a reading saved state 88 can be entered in response to a "read saved" voice command.

Figure 12:
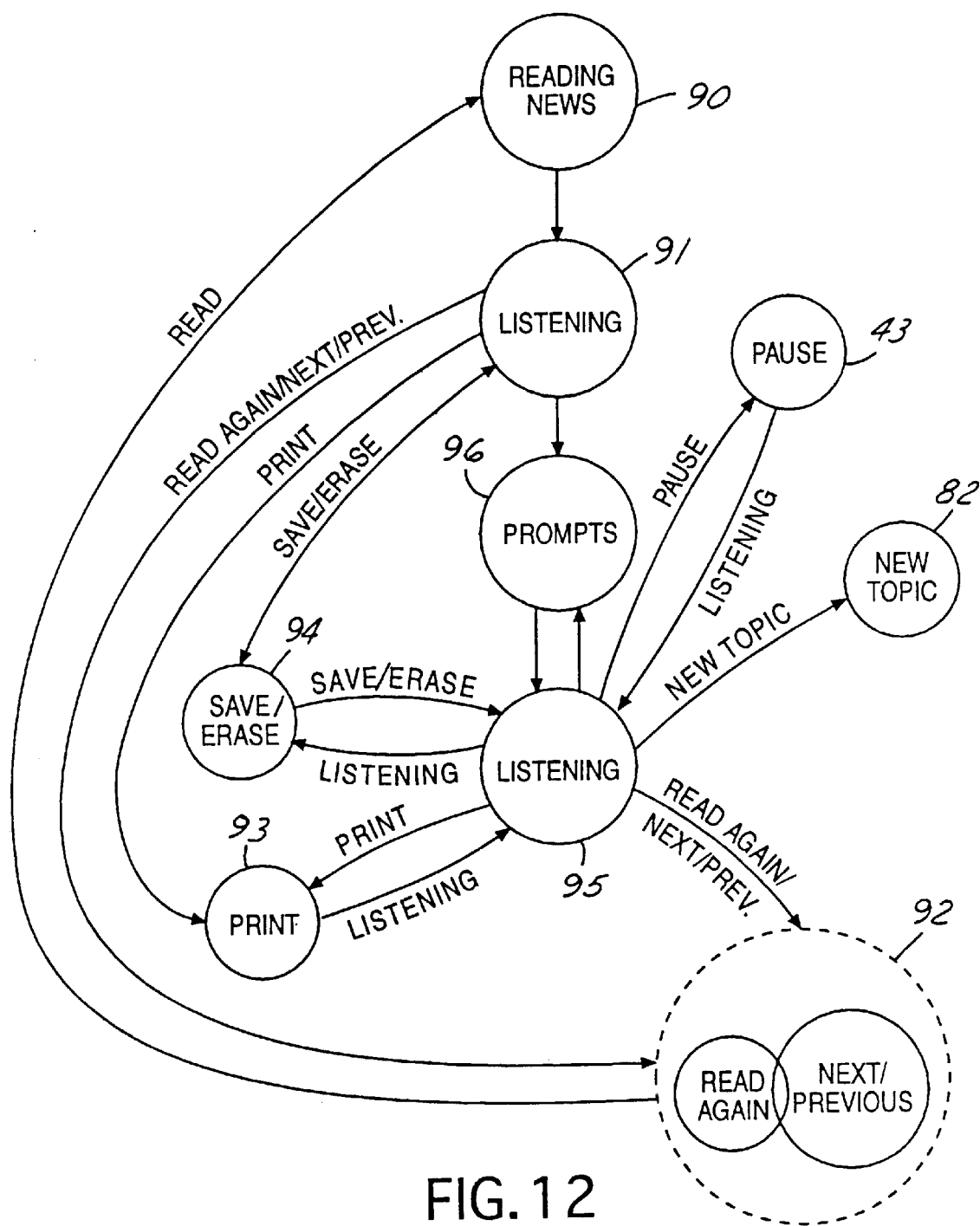
FIG. 12 is a state diagram showing the reading news state within the news mode in greater detail.

States 87 and 88 are implemented as shown in FIG. 12. A reading news state 90 reproduces a current news item (using audible text to speech) and configures the reconfigurable control elements for accessing next or previous news items or reading again the current news item. Following reading of a news item, a transition is made to listening state 91 for receiving a command for working with the current news item. In response to either a voice command from listening state 91 or manual activation of a reconfigurable control element for "read again/next/previous" commands, a transition is made to read-again/next/previous state 92. State 92 updates the news item desired and returns to reading news state 90.

From listening state 91, a news item may be printed in print state 93 or may be saved or erased in save/erase state 94. Following these actions, a listening state 95 is entered which may lead back to states 92, 93, or 94 for working with the current news topic or back to state 82 for selecting a new topic. If a predetermined time passes while in state 91 without receiving a voice command, additional prompts are reproduced in state 96, and then a transition is made to state 95.

In order to expand use of the present invention to include a web browser function, additional use is made of central display/control unit 16 of FIG. 1. The reason for this is that data entry and output for web browsing may become unmanageable and inconvenient using only voice input and output. However, it may be desirable to make web browser functions available only when the vehicle is not moving (i.e., parked) and to divide web-based information into predetermined categories for browsing. Control push buttons on central display/control unit 16 allow input of web browsing information and selection of hyper links, for example. The display section of central display/control unit 16 can then function similarly to a computer screen during web browsing. The parked status of the vehicle may be monitored by switches in the transmission gear selector lever, as is known in the art.

Voice commands corresponding to the predetermined categories for web browsing can allow some of the browsing to be controlled by voice. Integrated use of voice commands and central display/control unit push buttons provides an simple and efficient interface for the user.

What is claimed is:

1. A mobile information system in a vehicle for processing information which is wirelessly exchanged with a remote information server, comprising:

a microphone for receiving spoken sounds;

a speech processor coupled to said microphone for recognizing said spoken sounds and identifying corresponding voice commands for processing said information;

a state controller responsive to commands including said
voice commands from said speech processor, said state
controller having a main menu mode and an electronic
mail mode;

reconfigurable control elements coupled to said state
controller and mounted on a steering wheel of said
vehicle for generating control signals to select particular manual commands in accordance with a current
state of said state controller;

a heads-up display coupled to said state controller and
displaying at least one indicator above an instrument
panel of said vehicle, said indicator identifying said
manual commands available in said current state;

a voice synthesizer for generating audio output corresponding to said information; and a wireless communication device for exchanging said
information with said remote information server;

wherein said main menu mode provides selectable access
to said electronic mail mode; and wherein said electronic mail mode is comprised of 1) an
"initial mail" state for selecting by voice command the
reading of either old mail or new mail, 2) a "reading
note" state wherein said old mail or new mail is
reproduced by said voice synthesizer, and 3) a "next/
previous note" state that is accessed from said "reading
note" state to select a different electronic mail note for
said "reading note" state in response to either a corresponding voice command or a manual command.

2. The system of claim 1 wherein said state controller
further has a news mode selectable from said main menu
mode and wherein said news mode is comprised of 1) an
"initial news" state for selecting by voice command a news
topic, 2) a "reading news" state wherein a news item from
said processed information is reproduced by said voice
synthesizer, and 3) a "next/previous news" state that is
accessed from said "reading news" state to select a different
news item for said "reading news" state in response to either
a corresponding voice command or a manual command.

3. The system of claim 1 wherein said state controller
further has a calendar mode selectable from said main menu
mode and wherein said calendar mode is comprised of 1) an
"initial calendar" state for selecting by voice command a
calendar date, 2) a "reading calendar" state wherein a
calendar item from said processed information is reproduced
by said voice synthesizer, and 3) a "next/previous calendar"
state that is accessed from said "reading calendar" state to
select a different calendar item on the same calendar date for
said "reading calendar" state in response to either a corresponding voice command or a manual command.

4. The system of claim 1 wherein other ones of said
reconfigurable control elements can be manually activated
while in said "reading note" state to fast scan within a
currently reproduced note.

5. The system of claim 1 wherein other selected ones of
said reconfigurable control elements can be manually activated while in said "reading note" state to adjust playback
speed of said voice synthesizer.

6. The system of claim 1 further comprising a display
panel coupled to said state controller and including a visual
display and a plurality of control push buttons, wherein said
state controller further includes a web browser mode selectable from said main menu mode in which said information
exchanged with said remote information server includes
worldwide web information, wherein said worldwide web
information is displayed on said visual display, and wherein
individual states within said web browser mode are selected
using said voice commands, said manual commands, or
manual activations of said control push buttons.

7. The system of claim 6 wherein said web browser mode
is available only when said vehicle is parked.

8. The system of claim 6 wherein said web browser mode
is limited to accessing predetermined categories of
information, each predetermined category having a corresponding voice command.

9. An interface for a mobile information system in a
vehicle for processing information which is wirelessly
exchanged with a remote information server, wherein said
mobile information system includes (i) a microphone for
receiving spoken sounds, (ii) a speech processor coupled to
said microphone for recognizing said spoken sounds and
identifying corresponding voice commands for processing
said information, (iii) a state controller responsive to commands including said voice commands from said speech
processor, (iv) reconfigurable control elements coupled to
said state controller and mounted on a steering wheel of said
vehicle for generating control signals to select particular
manual commands in accordance with a current state of said
state controller, (v) a heads-up display coupled to said state
controller and displaying at least one indicator above an
instrument panel of said vehicle, said indicator identifying
said manual commands available in said current state, (vi) a
voice synthesizer for generating audio output corresponding
to said information, and (vii) a wireless communication
device for exchanging said information with said remote
information server, said interface comprising:

a main menu mode providing selectable access to a
plurality of mobile office modes in response to predetermined voice commands; and an electronic mail mode selectably accessible from said
main menu mode in response to a respective one of said
predetermined voice commands;

wherein said electronic mail mode is comprised of 1) an
"initial mail" state for selecting by voice command the
reading of either old mail or new mail, 2) a "reading
note" state wherein said old mail or new mail is
reproduced by said voice synthesizer, and 3) a "next/
previous note" state that is accessed from said "reading
note" state to select a different electronic mail note for
said "reading note" state in response to either a corresponding voice command or a manual command.

10. The interface of claim 9 further comprising:

a news mode selectably accessible from said main menu
mode in response to a respective one of said predetermined voice commands;

wherein said news mode is comprised of 1) an "initial
news" state for selecting by voice command a news
topic, 2) a "reading news" state wherein a news item
from said processed information is reproduced by said
voice synthesizer, and 3) a "next/previous news" state
that is accessed from said "reading news" state to select
a different news item for said "reading news" state in
response to either a corresponding voice command or a
manual command.

11. The interface of claim 9 further comprising:

a calendar mode selectably accessible from said main
menu mode in response to a respective one of said
predetermined voice commands;

wherein said calendar mode is comprised of 1) an "initial
calendar" state for selecting by voice command a
calendar date, 2) a "reading calendar" state wherein a
calendar item from said processed information is reproduced by said voice synthesizer, and 3) a "next/ previous calendar" state that is accessed from said "reading calendar" state to select a different calendar item on the same calendar date for said "reading calendar" state in response to either a corresponding voice command or a manual command.

12. The interface of claim 9 wherein said mobile information system further includes a display panel coupled to said state controller, said display panel including a visual display and a plurality of control push buttons, wherein said interface further comprises:

a web browser mode selectably accessible from said main menu mode in response to a respective one of said predetermined voice commands, wherein said information exchanged with said remote information server includes worldwide web information, wherein said worldwide web information is displayed on said visual display, and wherein individual states within said web browser mode are selected using said voice commands, said manual commands, or manual activations of said control push buttons.

13. The interface of claim 12 wherein said web browser mode is available only when said vehicle is parked.

* * * * *